US006955439B2

(12) United States Patent
Reismiller et al.

(10) Patent No.: US 6,955,439 B2
(45) Date of Patent: Oct. 18, 2005

(54) DUAL FILAMENT STATIC BENDING LAMP

(75) Inventors: Phillip A. Reismiller, Frankton, IN (US); Tony E. Collins, Alexandria, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/372,590

(22) Filed: Feb. 21, 2003

(65) Prior Publication Data

US 2004/0165373 A1 Aug. 26, 2004

(51) Int. Cl.[7] .................................................. B60Q 1/12
(52) U.S. Cl. .......................................... 362/36; 362/212
(58) Field of Search ................................ 362/362, 212, 362/39–43, 45, 48, 464, 465, 211, 213, 544, 276, 36; 315/81; 340/465, 426.31

(56) References Cited

U.S. PATENT DOCUMENTS 3,567,918 A * 3/1971 Schable ...................... 362/247
3,855,462 A * 12/1974 Kondo ........................ 362/36
4,638,408 A * 1/1987 Wetherington .............. 362/211
4,945,453 A 7/1990 Serizawa et al.
5,060,120 A 10/1991 Kobayashi et al.
5,517,389 A 5/1996 Myers
5,725,298 A 3/1998 Kalze et al.
5,931,572 A 8/1999 Gotoh
6,049,749 A 4/2000 Kobayashi
6,068,391 A 5/2000 Saladin et al.
6,409,369 B1 6/2002 De Lamberterie
6,439,739 B1 8/2002 Sischka
6,443,602 B1 9/2002 Tanabe et al.
6,481,876 B2 * 11/2002 Hayami et al. ............. 362/464
2002/0039289 A1 4/2002 Kinouchi
2002/0109998 A1 8/2002 Nouet et al.

* cited by examiner

*Primary Examiner*—John Anthony Ward
*Assistant Examiner*—Bao Q. Truong
(74) *Attorney, Agent, or Firm*—Ice Miller

(57) ABSTRACT

The present invention comprises a bending lamp apparatus and method of use. A first filament is energized as a vehicle begins to turn so as to provide illumination in the direction of the turn. As the turn becomes more severe, a second filament is energized such that an additional area is illuminated in the direction of the turn.

13 Claims, 3 Drawing Sheets

42 40 46 48 50 38 36 32 30 30

DUAL FILAMENT STATIC BENDING LAMP

BACKGROUND OF THE INVENTION

The present invention relates generally to automotive lighting systems and, more specifically, to automotive bending lamps.

In response to changing driving conditions, it can become desirable to adjust the beam pattern of a headlamp assembly relative to the vehicle. For example, when a vehicle is being driven around a corner, it may be desirable for the beam pattern of that vehicle's forward lighting system to be adjusted, axially and/or laterally, such that the emitted light better illuminates the area in the direction the vehicle is turning. The vehicle lighting industry refers to lighting used to illuminate the path of a vehicle while the vehicle is turning as "bending light.". Automotive headlamps wherein the forward light beam of the headlamp is physically re-aimed to provide bending light are generally known in the industry as adaptive front lighting systems ("AFS"). AFS lighting systems can be very expensive, because of the control systems needed to physically re-aim the light beam.

In certain applications, rather than moving the forward light beam pattern, the vehicle lighting industry has developed static supplemental lighting fixtures which are aimed so as to illuminate the general direction in which a vehicle is being turned. Static supplemental lighting fixtures which are used to provide bending light are controlled on and off by means generally known in the art. These systems, while less expensive than AFS systems, have certain limitations. For example, some turns are more severe than other turns, yet the static supplemental lighting fixtures cannot be further adjusted to better illuminate the path of the vehicle.

Therefore, it is desirable to provide a bending lamp that allows for significant angular displacement of the light beam of a headlamp assembly without excessive light beam distortion and without the need to move the entire headlamp assembly. It is further desired that the system be of inexpensive and dependable construction, while providing for increased scope of illumination as the severity of the turn is increased. It is further desired that the headlamp assembly be easily configured to fit within space confines of a variety of vehicle designs.

BRIEF SUMMARY OF THE INVENTION

In accordance with the present invention, a bending lamp system comprises two filaments within a static bending light fixture. According to one embodiment of the invention, a dual filament static bending light fixture may be located within a standard headlamp assembly for ease of design and construction. The dual filament static bending light fixture includes a reflector. The first filament provides illumination of the vehicle's path for less severe turns. The second filament, which may be, but need not be, of the same wattage, is activated for more severe turns. The filaments are offset such that the second filament creates an additional area of illumination. Moreover, the reflector prescription and/or lens prescription may be designed so as to focus the light from the two filaments into the desired beam pattern.

DETAILED DESCRIPTION OF THE INVENTION

Figure 1:
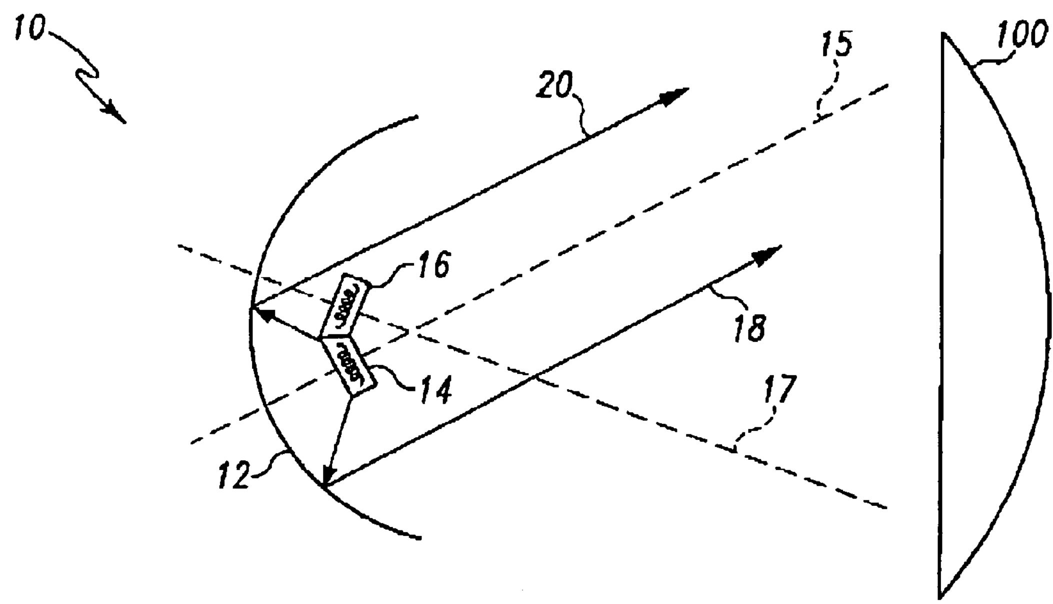
FIG. 1. is a diagrammatic view of a dual filament bulb within a reflector according to the present invention with only one filament energized.

Referring to FIG. 1, one embodiment of the present invention is described. FIG. 1 is a diagrammatic view of a dual filament bulb within a reflector according to the present invention. Fixture 10 comprises reflector 12, a first filament 14 with a first optical axis 15, and a second filament 16 with a second optical axis 17. In FIG. 1, filament 14 is energized, and light rays 18 and 20 show exemplary light rays formed by first filament 14 and reflected off reflector 12.

Figure 2:
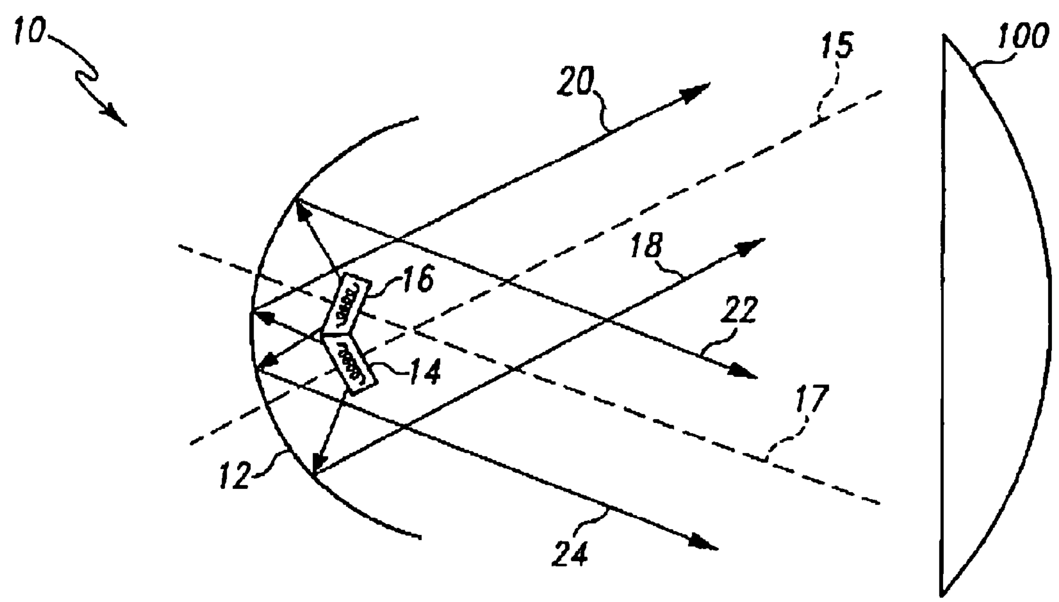
FIG. 2 is a diagrammatic view of the dual filament bulb within a reflector of FIG. 1 with both filaments energized.

Referring now to FIG. 2, the dual filament bulb of FIG. 1 is shown with both filaments energized. Filament 16 is energized, and light rays 22 and 24 show exemplary light rays formed by second filament 16 and reflected off reflector 12.

Figure 3:
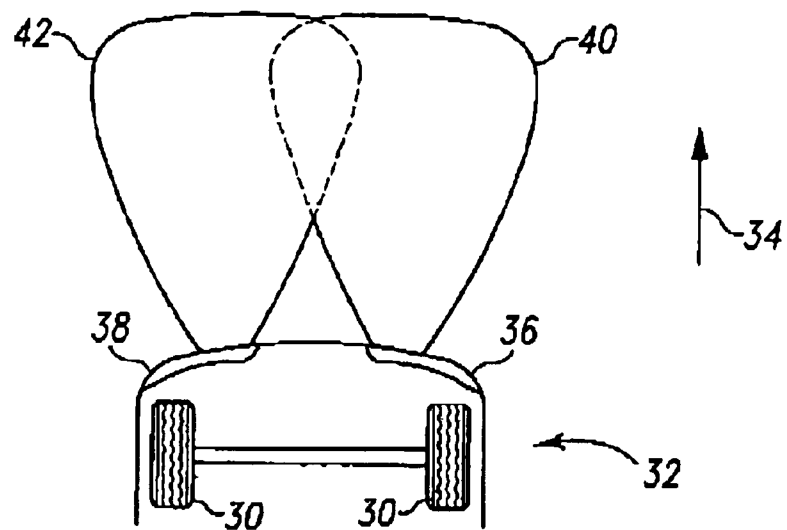
FIG. 3 is a diagrammatic view of a vehicle with only forward lighting energized.

Operation of fixture 10 is described with reference to FIGS. 3–5. FIG. 3 is a diagrammatic view of a vehicle with only forward lighting energized. Headlamp assemblies 36 and 38 in this embodiment include forward lamp fixtures as well as fixture 10. Wheels 30 of vehicle 32 are shown in a generally forward configuration. Thus, when moving, vehicle 32 would move in the direction generally indicated by arrow 34. Accordingly, filament 14 and filament 16 are not energized, and only areas 40 and 42 are illuminated.

Figure 4:
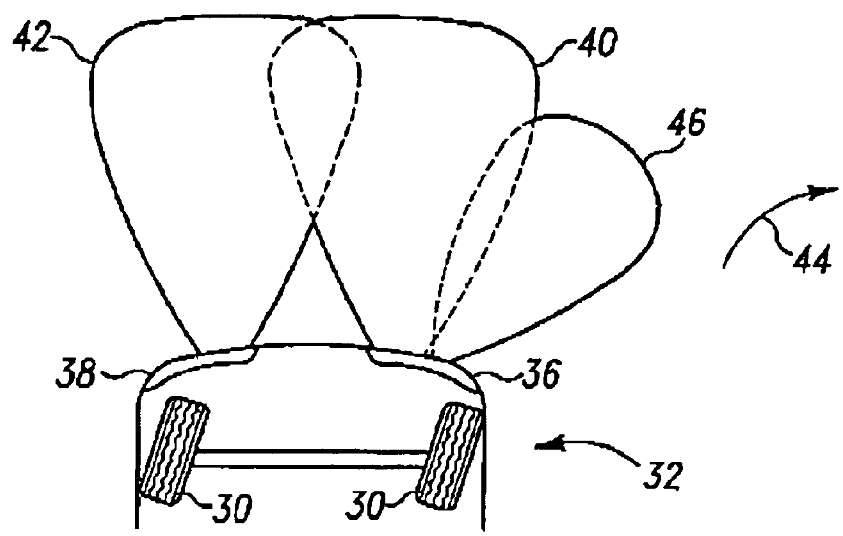
FIG. 4 is a diagrammatic view of the vehicle of FIG. 3 during a slight turn in which a first bending light filament is energized in accordance with the present invention.

Referring now to FIG. 4, wheels 30 of vehicle 32 are shown turned away from the generally forward configuration of FIG. 3. Thus, when moving, vehicle 32 would move in the direction generally indicated by arrow 44. In accordance with the present invention, the turn condition is sensed as having exceeded a threshold, and filament 14 is energized. Thus, illumination is provided by filament 14 to area 46. Those of skill in the art will understand that movement of the vehicle is not necessary in order to practice the present invention. For example, the sensed turning condition for energizing filament 14 may be determined solely upon the position of wheels 30, a turn signal switch, speed, or some combination of the foregoing. For example, even when the wheels are in a generally forward configuration, it may be desired to provide addition lighting as the speed of the vehicle increases. In yet another example, vehicle speed is combined with other input, such as wheel position to provide a sensed turn condition. Thus, at a lower speed, a slight turn will not result in filament 14 being energized, while the same turn at a higher speed results in filament 14 being energized. These and other variations are within the scope of the present invention.

Figure 5:
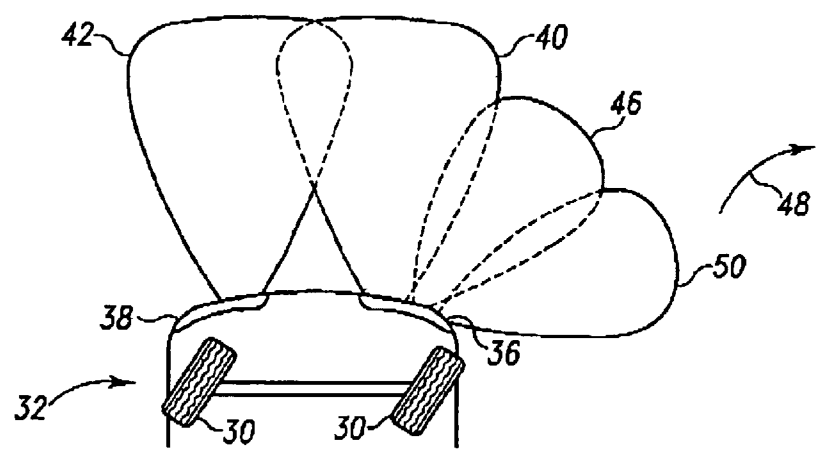
FIG. 5 is a diagrammatic view of the vehicle of FIG. 4 during a severe turn in which a first and a second bending light filament is energized in accordance with the present invention.

Referring now to FIG. 5, wheels 30 of vehicle 32 are shown turned even farther away from the generally forward configuration of FIG. 3. Thus, when moving, vehicle 32 would turn in a more severe turn than the turn shown in FIG. 4, in the direction indicated by arrow 48. In accordance with the present invention, the turn is sensed as having exceeded a threshold, and filament 14 is energized. Thus, illumination is provided by filament 14 to area 46. However, because the sensed turn exceeds a second threshold, filament 16 is also energized. Thus, illumination is provided by filament 16 to area 50. Similar to the first threshold, a variety of sensed conditions may be used jointly or independently in defining the second threshold.

While the present invention has been described in detail with reference to certain exemplary embodiments thereof, such are offered by way of non-limiting example of the invention, as other versions are possible. By way of example, but not of limitation, the fixture may include more than one optical axis. Thus, one filament may be used predominantly to provide light along a first optical axis, and a second filament may be used predominantly to provide light along a second optical axis. Those of skill in the art will recognize that a lens 100 (as shown in FIGS. 1 and 2 ) with multiple prescriptions and/or a reflector with multiple prescriptions may be used to define multiple optical axes. Moreover, a number of design choices exist within the scope of the present invention. For example, the filament may be oriented or located in a variety of positions within the fixture. Additionally, the fixture may be located within an assembly dedicated to bending light, or incorporated into a combined forward lighting/bending lighting unit. It is anticipated that a variety of other modifications and changes will be apparent to those having ordinary skill in the art and that such modifications and changes are intended to be encompassed within the spirit and scope of the invention as defined by the following claims.

We claim:

1. An automotive lamp fixture comprising:

a. at least one reflector;

b. a first filament positioned within the at least one reflector, said reflector configured such that when a turn in a first direction is sensed, and the first filament is energized, a first area is illuminated by light reflected by said at least one reflector; and c. a second filament positioned within the same at least one reflector as the first filament, said at least one reflector also configured, such that when a more severe turn in the first direction is sensed and the second filament is energized, a second area horizontally adjacent to the first area is illuminated.

2. The lamp fixture of claim 1, wherein the first filament is positioned to produce light along a first optical axis and the second filament is positioned to produce light along a second optical axis which is horizontally disposed to the first optical axis.

3. The lamp fixture of claim 2, wherein the at least one reflector comprises a reflector having a first prescription and a second prescription, the first prescription defining the first optical axis and the second prescription defining the second optical axis.

4. The lamp fixture of claim 2, further comprising at least one lens covering both the first filament and the second filament.

5. The lamp fixture of claim 4, wherein the at least one lens comprises a lens having a first prescription and a second prescription, the first prescription defining the first optical axis and the second prescription defining the second optical axis.

6. The lamp fixture of claim 1, wherein the lamp fixture comprises a dedicated lamp fixture positioned on an automobile to provide bending light for turning corners.

7. An automotive light fixture dedicated to provide bending light for an automobile, the light fixture comprising:

a. a first filament positioned within a reflector and illuminated in response to the commencement of a turn in a first direction; and b. a second filament positioned horizontally offset from the first filament within the same reflector and illuminated in response to the commencement of a more severe turn in the same first direction, the first filament arranged and positioned within the reflector to illuminate a first area, and the second filament arranged and positioned within the reflector to illuminate a second area horizontally disposed to the first area.

8. The fixture of claim 7, wherein the reflector comprises a reflector having a first prescription and a second prescription, the first prescription defining a first optical axis and the second prescription defining a second optical axis.

9. The fixture of claim 8, wherein the first filament is located within the reflector so as to provide illumination substantially along the first optical axis, and the second filament is located within the reflector so as to provide illumination substantially along the second optical axis.

10. The light fixture of claim 7, further comprising a lens that covers both the first and second filaments.

11. The light fixture of claim 10, wherein the lens is configured to have a first prescription and a second prescription, the first prescription defining a first optical axis and the second prescription defining a second optical axis.

12. The light fixture of claim 11, wherein the first filament is located so as to provide illumination substantially along the first optical axis, and the second filament is located so as to provide illumination substantially along the second optical axis.

13. A method for providing bending light for a vehicle, the method comprising the steps of:

a. providing a vehicle lamp fixture with at least one first light source positioned within a reflector on a first optical axis and at least one second light source positioned within the same reflector on a second optical axis, the second optical axis being horizontally disposed in respect to the first optical axis;

b. energizing the first light source in response to a sensed turn condition in a first direction, so that the first light source projects the light along the first optical axis and illuminates a first area around the first optical axis; and c. energizing the second light source in response to a more severe turn condition in the same first direction, so that the second light source projects the light along the second optical axis and illuminates a second area around the second optical axis that is substantially horizontally adjacent to the first area.

* * * * *